United States Patent [19]

Su

[11] Patent Number: 5,558,537

[45] Date of Patent: Sep. 24, 1996

[54] CEILING FIXTURE MOUNTING STRUCTURE

[76] Inventor: Hsiu-Ling Su, 4/F., No. 11, Alley 9, Lane 105, Tien-Mu E. Rd., Taipei City, Taiwan

[21] Appl. No.: 393,672

[22] Filed: Feb. 24, 1995

[51] Int. Cl.[6] .................................................. H01R 13/625
[52] U.S. Cl. .......................................... 439/537; 439/334
[58] Field of Search .................................... 439/334, 537, 439/529, 530, 533, 332, 333, 335–337

[56] References Cited

U.S. PATENT DOCUMENTS

| | | | |
|---|---|---|---|
| 3,798,584 | 3/1974 | Person | 439/537 |
| 3,985,417 | 10/1976 | Fenton | 439/537 |
| 4,952,157 | 8/1990 | Hudson et al. | 439/537 |

Primary Examiner—Gary F. Paumen
Attorney, Agent, or Firm—Morton J. Rosenberg; David I. Klein

[57] ABSTRACT

A ceiling fixture mounting structure including a ceiling fixture holder fixed to the ceiling around the wire hole on the ceiling, a circular mounting plate detachably fastened to the ceiling fixture holder by swivel joint and having a connecting block with a cut at the center, and a ceiling fixture body fastened to the mounting plate by screws, wherein by matching the cut on the connecting block with a stop plate on the ceiling fixture holder, the mounting plate is accurately fastened to the ceiling fixture holder, causing the contact metal plates of on the connecting block respectively and positively disposed in contact with the contact metal plates on the ceiling fixture holder.

1 Claim, 7 Drawing Sheets

5,558,537

CEILING FIXTURE MOUNTING STRUCTURE

BACKGROUND OF THE INVENTION

The present invention relates to ceiling fixtures, and relates more particularly to ceiling fixture mounting structures.

FIG. 6 shows a ceiling fixture mounting structure according to the prior art, which is generally comprised of an elongated mounting frame 4 fixedly secured to the ceiling 38 corresponding to the wire hole 381 on the ceiling 38 by steel nails 41 and 42, and a ceiling fixture body 5 fastened to the mounting frame 4 by screws 43 and 44 and nuts 431 and 441 and caps 432 and 442. Before the ceiling fixture body 5 is fixedly secured to the mounting frame 4, the electric wires must be respectively connected to the electric wires in the wire hole 381. Because the ceiling fixture body 5 is heavy, it is difficult to install the ceiling fixture by one person, and the operator is difficult to hold the ceiling fixture in place during its installation. If the ceiling fixture body 5 is not firmly held in hand during the installation process, it may fall from the hand.

SUMMARY OF THE INVENTION

The present invention has been accomplished to provide a ceiling fixture mounting structure which is easy to install by one person. According to one embodiment of the present invention, the ceiling fixture mounting structure comprises a ceiling fixture holder securely fixed to the ceiling around the wire hole on the ceiling by screws, which ceiling fixture holder comprises a plurality of retainer ribs raised from the periphery, an annular flange raised from a bottom side thereof, two contact metal plates respectively mounted within the annular flange at two opposite locations and connected to power supply, a ground rod and a stop plate fixedly mounted within the annular flange; a circular mounting plate fastened to the ceiling fixture holder, which circular mounting plate comprises a top chamber, which receives the ceiling fixture holder, a plurality of retainer flanges disposed in the top chamber and being respectively engaged with the retainer ribs of the ceiling fixture holder when the circular mounting plate is rotated clockwise after the insertion of the ceiling fixture holder into the top chamber, a ground screw bolt, and a connecting block fixedly secured to the top chamber by the ground screw bolt, the ground screw bolt being disposed in contact with the ground rod when the circular mounting plate is fastened to the ceiling fixture holder, the connecting block being fixedly mounted with two opposite contact metal plates and having a cut at one side, the contact metal plates on the connecting block being disposed in contact with the contact metal plates on the ceiling fixture holder when the circular mounting plate is fixed to the ceiling fixture holder, the circular mounting plate being accurately fastened to the ceiling fixture holder by matching the cut with the stop plate; and a ceiling fixture body fastened to the circular mounting plate by screws and nuts.

BRIEF DESCRIPTION OF THE DRAWINGS

FIG. 2A is a partial view in an enlarged scale of FIG. 2;

DETAILED DESCRIPTION OF THE PREFERRED EMBODIMENTS

Figure 1:
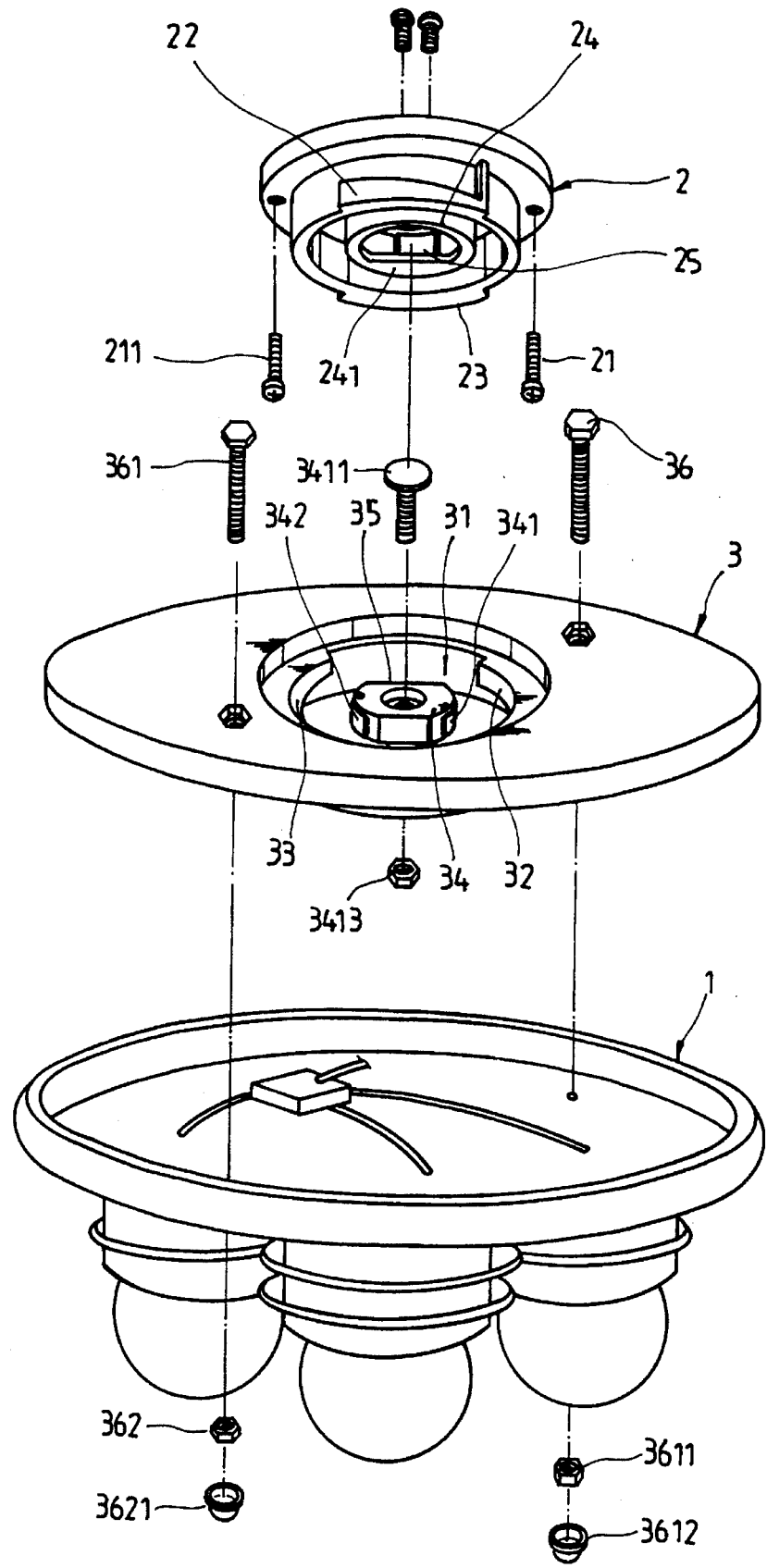
FIG. 1 is an exploded view of a ceiling fixture mounting structure according to a first embodiment of the present invention.
Figure 2:
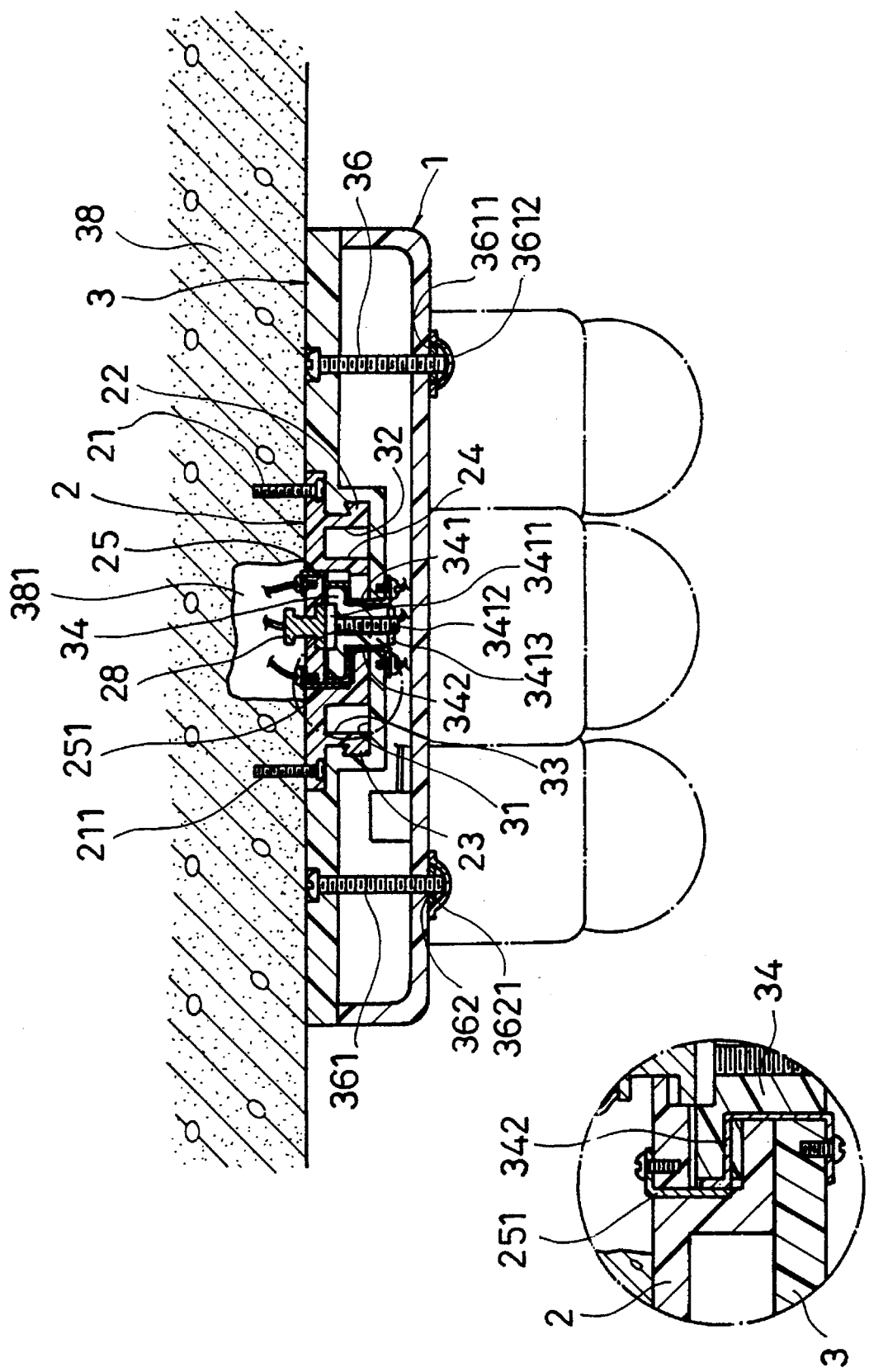
FIG. 2 is an installed view in section of the ceiling fixture mounting structure shown in FIG. 1.

Referring to FIGS. 1, 2 and 2A, a ceiling fixture holder 2 is securely fixed to the ceiling 38 around the wire hole 381 on the ceiling 38 by screws 21 and 211. The ceiling fixture holder 2 comprises a plurality of retainer ribs 22 and 23 raised from the periphery, an annular flange 24 raised from the bottom side, two contact metal plates 25 and 251 respectively mounted within the annular flange 24 at two opposite locations and connected to power supply, and a stop plate 241 fixedly mounted within the annular flange 24. A circular mounting plate 3 is securely fixed to the top side of a ceiling fixture body 1 by screw bolts 36 and 361, nuts 3611 and 362, and caps 3612 and 3621. The circular mounting plate 3 comprises a top chamber 31, which receives the ceiling fixture holder 2, a plurality of retainer flanges 32 and 33 disposed in the top chamber 31, which retainer flanges 32 are respectively engaged with the retainer ribs 22 and 23 of the ceiling fixture holder 2 when the circular mounting plate 3 is rotated clockwise after the insertion of the ceiling fixture holder 2 into the top chamber 21, and a connecting block 34 fixedly secured to the top chamber 31 by a ground screw bolt 3411 and a nut 3413. The connecting block 34 is fixedly mounted with two opposite contact metal plates 341 and 342, having a cut 35 at one side. By matching the cut 35 with the stop plate 241, the circular mounting plate 3 is accurately fastened to the ceiling fixture holder 2, causing the contact metal plates 341 and 342 of the connecting block 34 respectively and positively disposed in contact with the contact metal plates 25 and 251 of the ceiling fixture holder 2 (see FIG. 2A). The ceiling fixture holder 2 further comprises a ground rod 28, which is disposed in contact with the ground screw bolt 3411 to form a ground circuit when the circular mounting plate 3 is fixed to the ceiling fixture holder 2.

Figure 3:
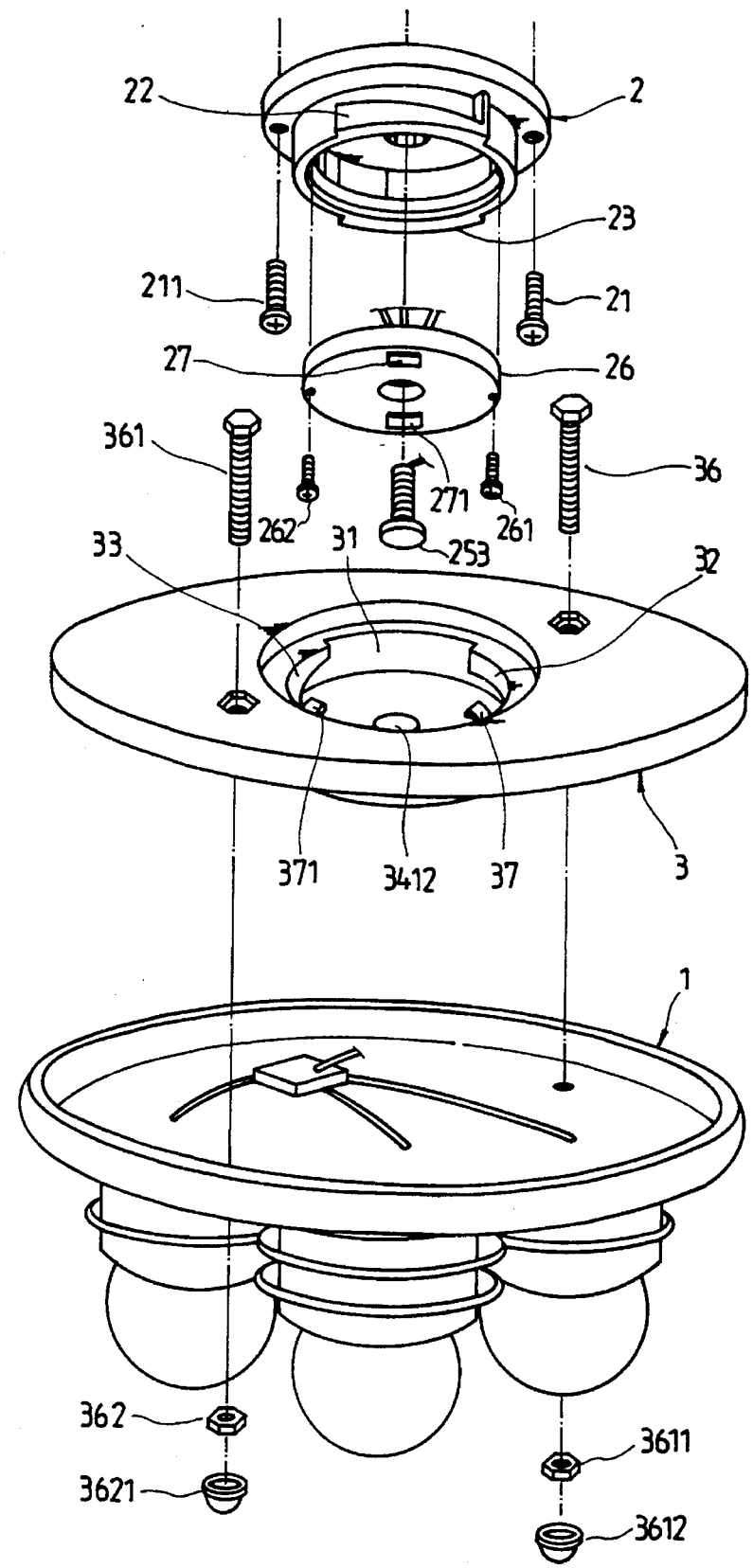
FIG. 3 is an exploded view of a ceiling fixture mounting structure according to a second embodiment of the present invention.
Figures 4, 4A:
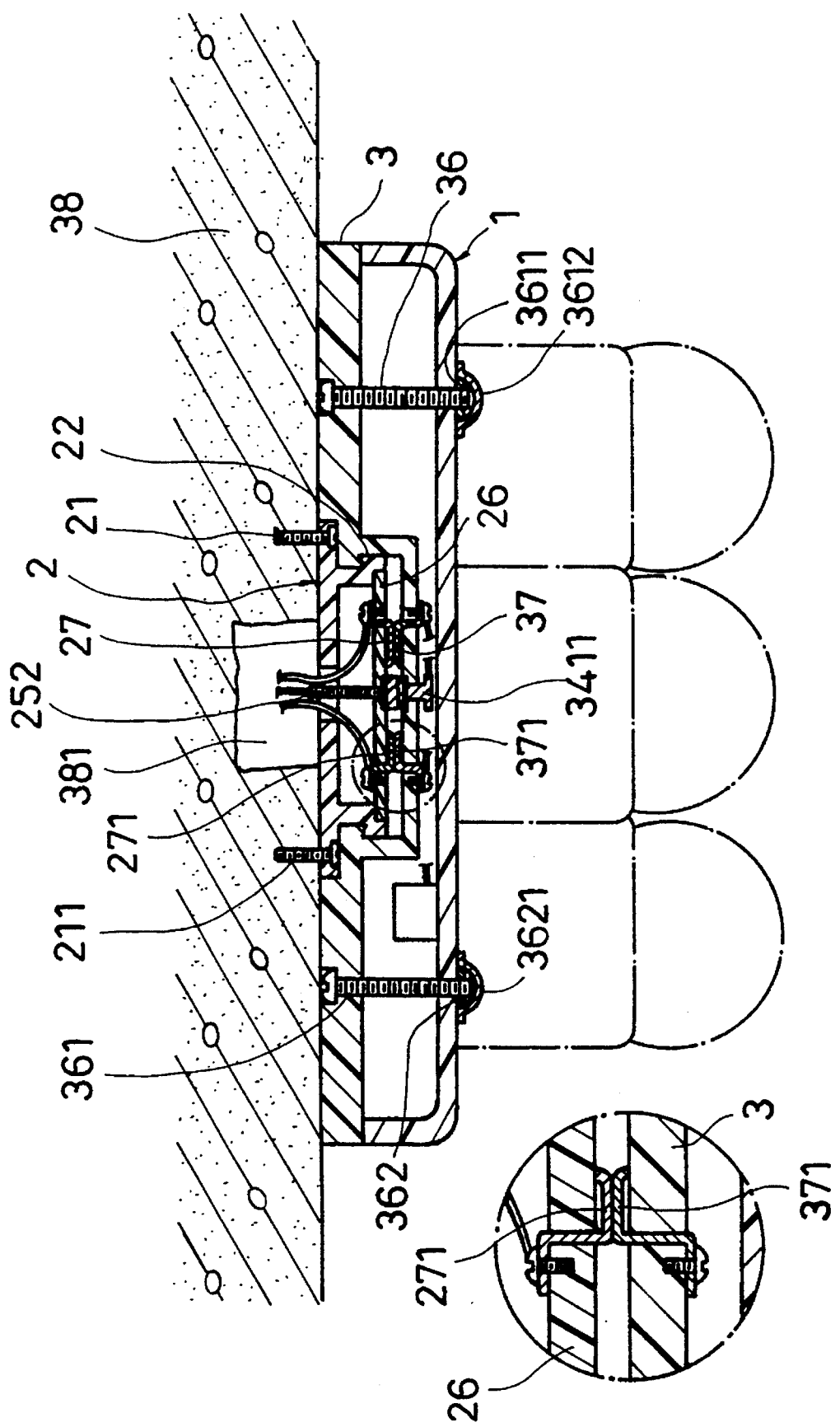
FIG. 4 is an installed view in section of the ceiling fixture mounting structure shown in FIG. 3.
FIG. 4A is a partial view in an enlarged scale of FIG. 4.

FIGS. 3, 4 and 4A show an alternate form of the present invention in which: the aforesaid annular flange 24 is eliminated from the ceiling fixture holder 2; a bottom plate 26 which has two opposite contact metal plates 27 and 271 respectively connected to a power supply and a ground rod 253 at the center is fixedly secured to the ceiling fixture holder 2 by screws 261 and 262; the aforesaid connecting block 34 is eliminated from the circular mounting plate 3; two contact metal plates 37 and 371 are fixedly mounted within the top chamber 31 and disposed in contact with the contact metal plates 27 and 271 on the bottom plate 26 and a ground rod 3412 is mounted within the top chamber 31 at the center and disposed in contact with the ground rod 253 on the bottom plate 26.

Figure 5:
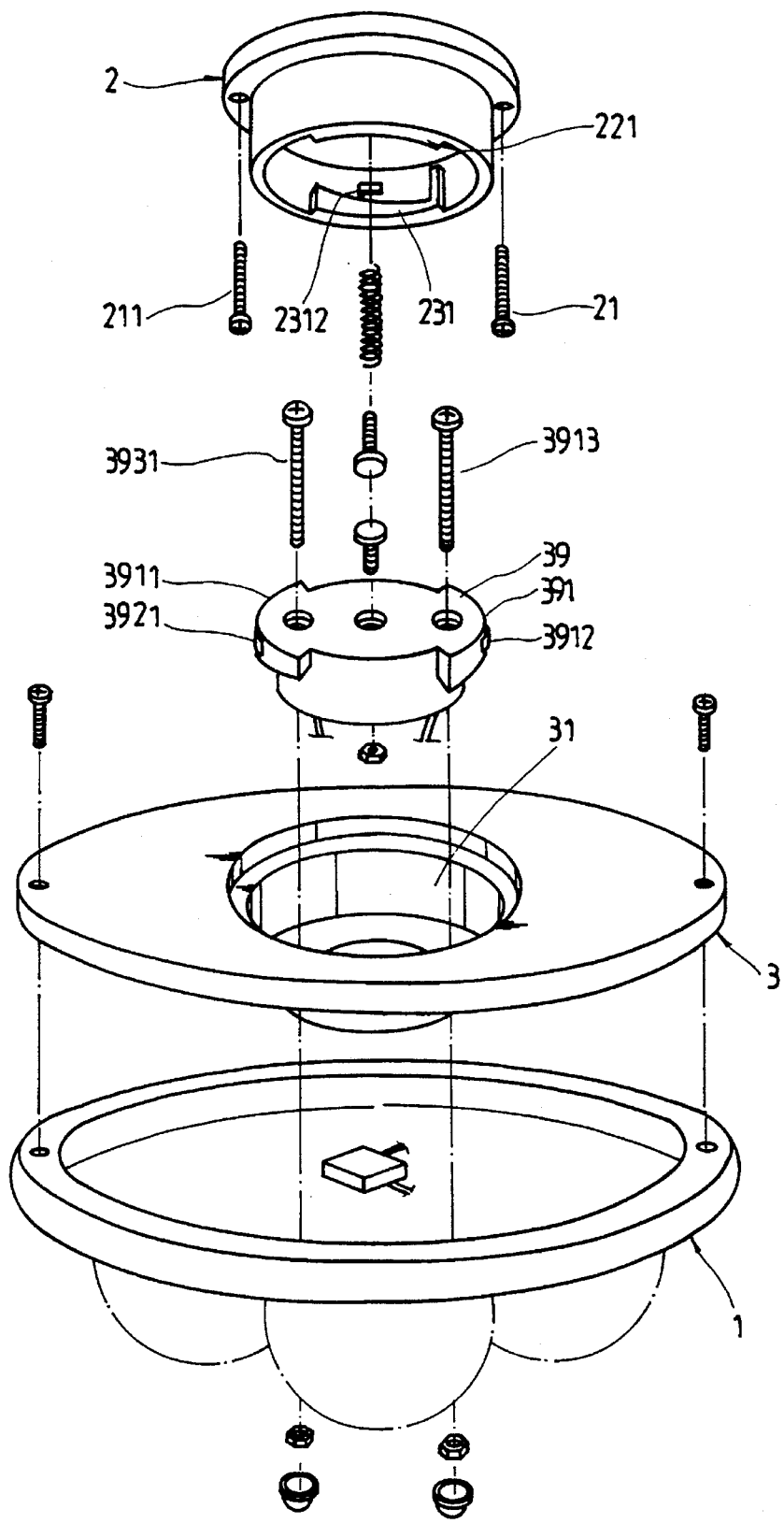
FIG. 5 is an exploded view of a ceiling fixture mounting structure according to a third embodiment of the present invention.
Figure 5A:
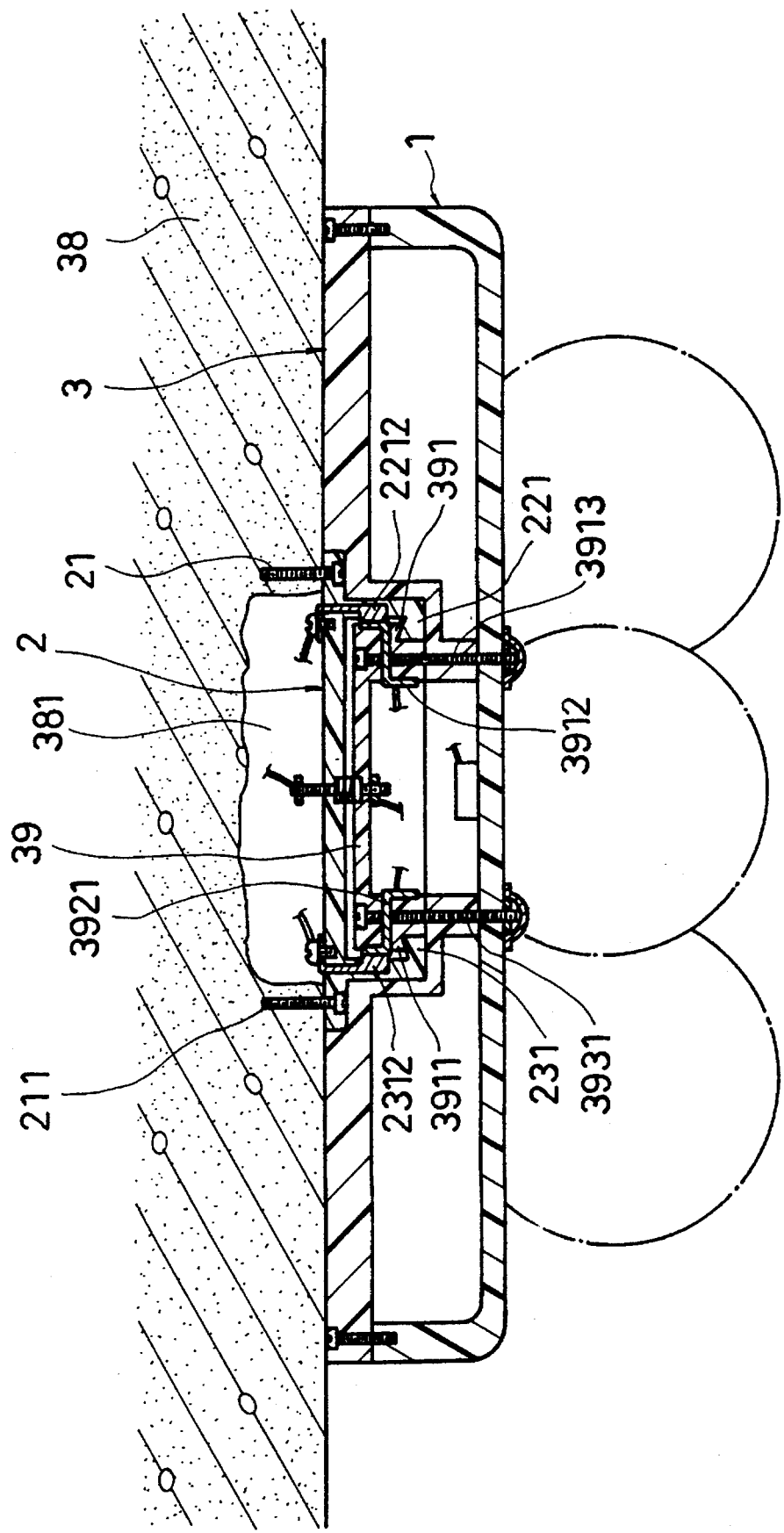
FIG. 5A is an installed view in section of the ceiling fixture mounting structure shown in FIG. 5.
Figure 6:
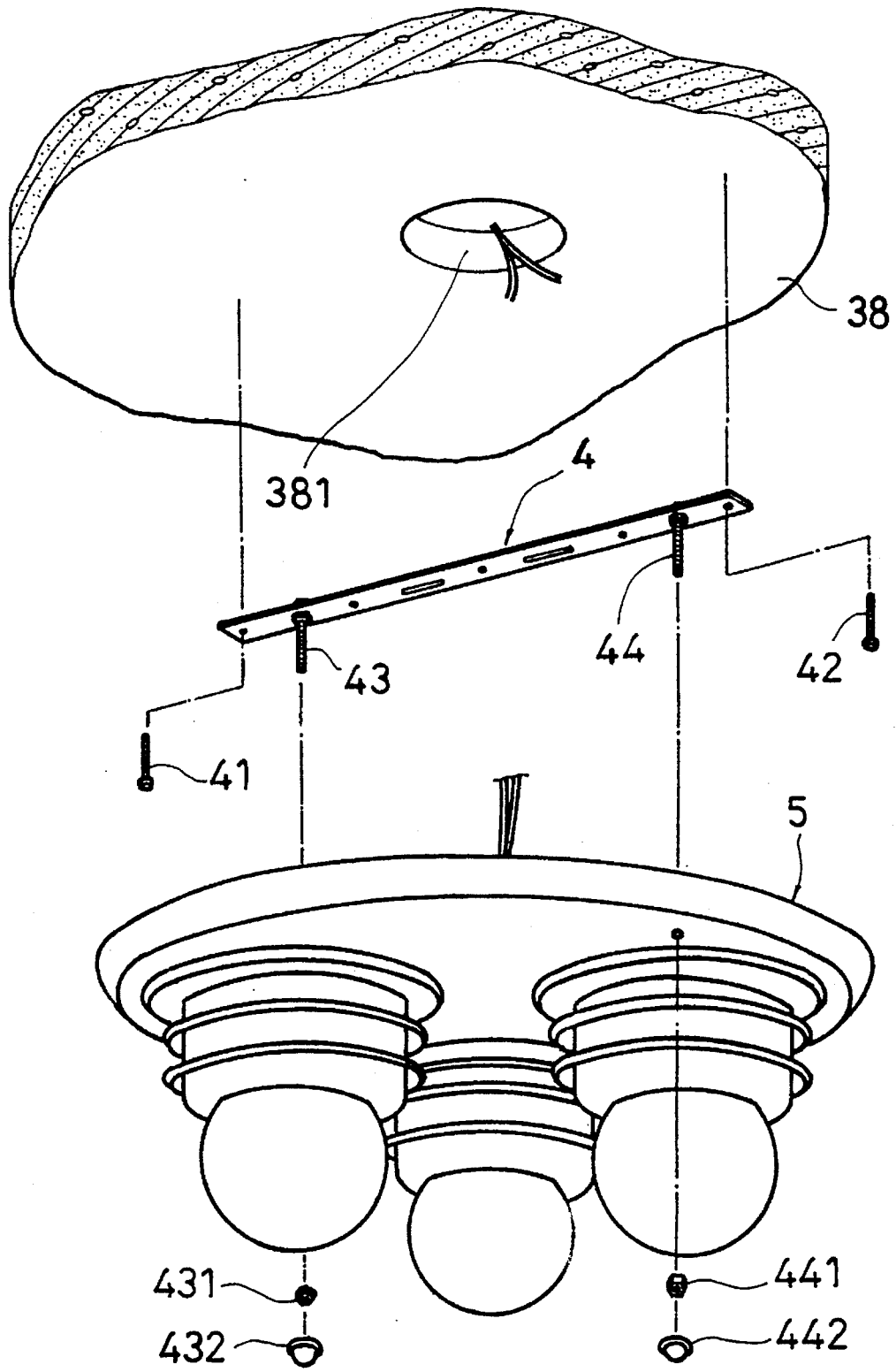
FIG. 6 is an exploded view of a ceiling fixture mounting structure according to the prior art.

FIGS. 5 and 5A show another alternate form of the present invention in which: a connecting block 39 is fixedly secured to the top chamber 31 of the circular mounting plate 3 by screws 3913 and 3931, having two opposite retainer flanges 391 and 3911 and two opposite contact metal plates 3912 and 3922 on the retainer flanges 391 and 3911; the ceiling fixture holder 2 comprises two opposite retainer ribs 221 and 231 respectively engaged with the retainer flanges 391 and 3911, and two contact metal plates 2212 and 2312 respectively disposed in contact with the contact metal plates 3912 and 3922.

It is to be understood that the drawings are designed for purposes of illustration only, and are not intended as a definition of the limits and scope of the invention disclosed.

What is claimed is:

1. A ceiling fixture mounting structure comprising:

a ceiling fixture holder securely fixed to the ceiling around a wire hole on the ceiling by screws, said ceiling fixture holder comprising a plurality of retainer ribs raised from the periphery;

a bottom plate fixedly secured to said ceiling fixture holder by screws, said bottom plate having two opposite contact metal plates at two opposite sides respectively connected a power supply, and a ground rod at the center;

a circular mounting plate fastened to said ceiling fixture holder, said circular mounting plate comprising a top chamber, which receives said ceiling fixture holder, a plurality of retainer flanges disposed in said top chamber and being respectively engaged with said retainer ribs of said ceiling fixture holder when said circular mounting plate is rotated clockwise after the insertion of said ceiling fixture holder into said top chamber, a ground rod, which is disposed in contact with the ground rod on said bottom plate when said circular mounting plate is fixed to said ceiling fixture holder, and two contact metal plates, which are disposed in contact with the contact metal plates on said bottom plate when said circular mounting plate is fixed to said ceiling fixture holder; and a ceiling fixture body fastened to said circular mounting plate by screws and nuts.

* * * * *